US010942783B2

(12) United States Patent
Chapman et al.

(10) Patent No.: US 10,942,783 B2
(45) Date of Patent: Mar. 9, 2021

(54) DISTRIBUTED COMPUTING USING DISTRIBUTED AVERAGE CONSENSUS

(71) Applicant: Hyperdyne, Inc., Palo Alto, CA (US)

(72) Inventors: Todd Allen Chapman, Palo Alto, CA (US); Ivan James Ravlich, Los Altos, CA (US); Christopher Taylor Hansen, Sunnyvale, CA (US)

(73) Assignee: HYPERNET LABS, INC., Redwood City, CA (US)

( * ) Notice: Subject to any disclaimer, the term of this patent is extended or adjusted under 35 U.S.C. 154(b) by 90 days.

(21) Appl. No.: 16/252,436

(22) Filed: Jan. 18, 2019

(65) Prior Publication Data

US 2019/0227850 A1  Jul. 25, 2019

Related U.S. Application Data

(60) Provisional application No. 62/619,715, filed on Jan. 19, 2018, provisional application No. 62/619,719,
(Continued)

(51) Int. Cl.
*H03M 13/05* (2006.01)
*G06Q 40/00* (2012.01)
(Continued)

(52) U.S. Cl.
CPC ............ *G06F 9/5061* (2013.01); *G06F 9/455* (2013.01); *H04L 67/10* (2013.01); *H04L 67/104* (2013.01)

(58) Field of Classification Search
CPC ................... G06F 9/5061; G06F 9/455; G06F 2209/5017; G06F 9/5027; H04L 67/104; H04L 67/10
(Continued)

(56) References Cited

U.S. PATENT DOCUMENTS 9,646,029 B1 *  5/2017  Baird, III ............ G06F 16/2365
9,817,701 B2 * 11/2017  Baptist ................. G06F 3/0659
(Continued)

OTHER PUBLICATIONS

PCT International Search Report and Written Opinion, PCT Application No. PCT/US19/14351, dated May 24, 2019, 16 pages.
(Continued)

*Primary Examiner* — Kevin T Bates
*Assistant Examiner* — Golam Mahmud
(74) *Attorney, Agent, or Firm* — Fenwick & West LLP (57) ABSTRACT

Each of a plurality of distributed computing devices receives a respective data partition of a plurality of data partitions for a computing task. A first distributed computing device generates a first partial result of a plurality of partial results generated by the plurality of distributed computing devices. The first computing device iteratively executes a distributed average consensus (DAC) process. At each iteration, the first computing device transmits the first partial result to a second computing device, receives a second partial result generated by the second computing device, and updates the first partial result by computing an average of the first and second partial results. In response to determining that respective partial results of the plurality of distributed computing devices have reached a consensus value, the first computing device stops executing the DAC process, and generates a final result of the computing task based on the consensus value.

20 Claims, 6 Drawing Sheets

Related U.S. Application Data filed on Jan. 19, 2018, provisional application No. 62/700,153, filed on Jul. 18, 2018.

(51) Int. Cl.
*G06Q 40/04* (2012.01)
*H04L 29/08* (2006.01)
*G06F 9/455* (2018.01)
*G06N 99/00* (2019.01)
*G06F 17/18* (2006.01)
*G06F 9/50* (2006.01)

(58) Field of Classification Search
USPC .......................................................... 709/201
See application file for complete search history.

(56) References Cited

U.S. PATENT DOCUMENTS

| | | | |
|---|---|---|---|
| 9,858,052 B2 * | 1/2018 | Bornstein | ............ G06F 16/122 |
| 10,645,024 B2 | 5/2020 | Quirk et al. | |
| 2002/0147628 A1 | 10/2002 | Specter et al. | |
| 2006/0020662 A1 | 1/2006 | Robinson | |
| 2007/0118518 A1 | 5/2007 | Wu et al. | |
| 2010/0161596 A1 | 6/2010 | Yan et al. | |
| 2010/0169340 A1 | 7/2010 | Kenedy et al. | |
| 2011/0106743 A1 | 5/2011 | Duchon | |
| 2013/0132392 A1 | 5/2013 | Kenedy et al. | |
| 2013/0151927 A1 * | 6/2013 | Leggette | ................ G06F 11/10 |
| | | | 714/763 |
| 2014/0025216 A1 | 1/2014 | Husen et al. | |
| 2014/0074269 A1 | 3/2014 | Weston et al. | |
| 2014/0282244 A1 | 9/2014 | Speer et al. | |
| 2015/0254328 A1 | 9/2015 | Dereszynski et al. | |
| 2015/0256897 A1 | 9/2015 | Van Stam | |
| 2015/0278200 A1 | 10/2015 | He et al. | |
| 2015/0312335 A1 * | 10/2015 | Ying | .................. H04L 67/1065 |
| | | | 709/201 |
| 2016/0036925 A1 | 2/2016 | Quirk et al. | |
| 2016/0154798 A1 | 6/2016 | Davis et al. | |
| 2016/0155067 A1 | 6/2016 | Dubnov et al. | |
| 2016/0248631 A1 | 8/2016 | Duchesneau | |
| 2016/0328253 A1 | 11/2016 | Majumdar | |
| 2017/0103468 A1 | 4/2017 | Orsini et al. | |
| 2017/0132630 A1 | 5/2017 | Castinado et al. | |
| 2017/0140262 A1 | 5/2017 | Wilson et al. | |
| 2017/0171580 A1 | 6/2017 | Hirsch et al. | |
| 2017/0173262 A1 | 6/2017 | Veltz | |
| 2017/0185672 A1 | 6/2017 | Yu et al. | |
| 2017/0331696 A1 | 11/2017 | Gupta et al. | |
| 2018/0150299 A1 * | 5/2018 | Balle | ........................ G06T 1/60 |
| 2018/0300315 A1 | 10/2018 | Leal et al. | |
| 2018/0314735 A1 | 11/2018 | Liu et al. | |

OTHER PUBLICATIONS

PCT Invitation to Pay Additional Fees and, Where Applicable, Protest Fee, PCT Application No. PCT/US19/14351, Mar. 27, 2019, 2 pages.

Baraglia, R. et al, "A peer-to-peer recommender system for self-emerging user communications based on gossip overlays," *Journal of Computer and System Sciences*, vol. 79, 2013, pp. 291-308.

Souptik, D. et al., "Uniform Data Sampling from a Peer-to-Peer Network," 27th International Conference on Distributed Computing Systems, Jun. 2007, 9 pages.

Wissman, B., "Peer-to-Peer is the Next Wave of Influencer Marketing," obtained online on Sep. 9, 2020 from https://www.entrepeneur.com/article/334472, dated Jun. 20, 2019, 14 pages.

* cited by examiner

DISTRIBUTED COMPUTING USING DISTRIBUTED AVERAGE CONSENSUS

CROSS REFERENCE TO RELATED APPLICATIONS

This application claims the benefit of U.S. Provisional Application No. 62/619,715, filed Jan. 19, 2018; U.S. Provisional Application No. 62/619,719, filed Jan. 19, 2018; and U.S. Provisional Application No. 62/700,153, filed Jul. 18, 2018; each of which is incorporated by reference in its entirety.

BACKGROUND

Distributed computing can be used to break a large computation into sub-components, assign distributed computing devices components of the computation, and combine the results from the distributed computing devices to generate the result of the computation. Existing methods for distributed computing use various techniques to obtain a result from a distributed computing task, e.g., selecting a coordinator to evaluate the sub-component results, or determining a majority result. Typical distributed computing operations are designed to be fault-tolerant, which allows convergence even if a computing device was not able to perform its assigned portion of the computation. However, such operations also allow a computing device that claims to contribute to the computation, but did not contribute, to converge with the other computing devices. Thus, in a typical distributed computing operation, the convergence result will not indicate if any computing devices did not participate in calculating the result. This is problematic in situations where computing devices receive compensation for their work, because a computing device may be able to receive compensation without performing any work.

SUMMARY

Systems and methods for performing computations in a distributed environment are described herein. To perform a computation in the distributed environment, different portions of the computation are assigned to different computing devices, and the results of the portions are combined to determine the computation result. The computation is portioned in such a way that the computing devices can exchange their portioned results in a peer-to-peer fashion, and perform a consensus algorithm that both (1) obtains the final computation result and (2) confirms that all of the contributing devices have performed their assigned portion of the computation. In particular, the computing devices perform a distributed average consensus (DAC) algorithm in which the computing devices repeatedly form connections, exchange data, and calculate an average of the exchanged data, which is used as the data to exchange in a subsequent step. When this procedure leads to a consensus (e.g., the averages across all computing devices settle around a consensus average value), the result of the DAC algorithm indicates whether each computing device has contributed to the calculation of the average. Thus, the DAC procedure is able to confirm that each computing device in the distributed environment has contributed to the calculation. The DAC procedure confirms that each computing device has participated using the same connections that are used to obtain the consensus result; thus, no additional routing protocols or overlay topologies are needed to confirm participation.

In addition to the DAC environment and algorithm, several exemplary applications for DAC are described herein. Distributed implementations for calculating a dot product, calculating a matrix-vector product, calculating a least squares calculation, and performing decentralized Bayesian parameter learning are described.

In one embodiment, a first distributed computing device of a plurality of distributed computing devices receives over a network a data partition of a plurality of data partitions for a computing task. Each of the plurality of distributed computing devices is assigned a respective data partition of the plurality of data partitions. The first distributed computing device generates a first partial result of a plurality of partial results generated by the plurality of distributed computing devices. The first distributed computing device iteratively executes a distributed average consensus (DAC) process. The DAC process includes, for each iteration of the process, transmitting the first partial result of the first distributed computing device to a second distributed computing device of the plurality of distributed computing devices, receiving a second partial result generated by the second distributed computing device from the second distributed computing device, and updating the first partial result of the first distributed computing device by computing an average of the first partial result and the second partial result. In response to determining that respective partial results of the plurality of distributed computing devices have reached a consensus value, the first distributed computing device determines to stop executing the DAC process. The first distributed computing device generates a final result of the computing task based on the consensus value.

In one embodiment, an intermediary computing device receives over a network a request for a computing task from a requesting computing device. The request includes a set of requirements for the computing task. The intermediary computing device transmits at least a portion of the set of requirements to a plurality of distributed computing devices over the network. The intermediary computing device receives over the network commitments from a plurality of distributed computing devices to perform the computing task. Each of the plurality of distributed computing devices meets the portion of the set of requirements. The intermediary computing device transmits, to each of the plurality of distributed computing devices, a respective data partition of a plurality of data partitions for the computing task. The plurality of distributed computing devices are configured to iteratively execute a distributed average consensus (DAC) process to calculate a consensus value for the computing task. The intermediary computing device returns a result of the computing task to the requesting computing device.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

It is noted that wherever practicable similar or like reference numbers may be used in the figures and may indicate similar or like functionality. A letter after a reference numeral, such as "130a," indicates that the text refers specifically to the element having that particular reference numeral. A reference numeral in the text without a following letter, such as "130," refers to any or all of the elements in the figures bearing that reference numeral. For example, "130" in the text refers to reference numerals "130a" and/or "130b" and/or "130c" in the figures.

Distributed Average Consensus (DAC) Environment

The DAC algorithm can be implemented in a two-sided market that includes requesting computing devices seeking computing power and distributed computing devices that provide computing power. The requesting computing devices, or users of the requesting computing devices, want to run a computing task on the distributed computing devices. The requesting computing devices may be used by scientists, statisticians, engineers, financial analysts, etc. The requesting computing device can transmit requests to one or more intermediary computing devices, which coordinate the fulfillment of the request with a set of distributed computing devices. The requesting computing devices request compute time on the distributed computing devices, and may provide compensation to the distributed computing devices in exchange for compute time. The arrangement between a requesting computing device and a set of distributed computing devices can be represented by a smart contract. A smart contract is an agreement made between multiple computing devices (e.g., a set of distributed computing devices, or a requesting computing device and a set of distributed computing devices) to commit computing resources to a computing task. A smart contract specifies a set of technical requirements for completing the computing task, and may specify compensation for completing the computing task or a portion of the computing task. The smart contract may include a list of distributed computing devices that have agreed to the smart contract. In some embodiments, smart contracts are published to a blockchain.

The requesting computing devices, intermediary computing devices, and distributed computing devices are computing devices capable of transmitting and receiving data via a network. Any of the computing devices described herein may be a conventional computer system, such as a desktop computer or a laptop computer. Alternatively, a computing device may be any device having computer functionality, such as a mobile computing device, server, tablet, smartphones, smart appliance, personal digital assistant (PDA), etc. The computing devices are configured to communicate via a network, which may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP).

Figure 1:
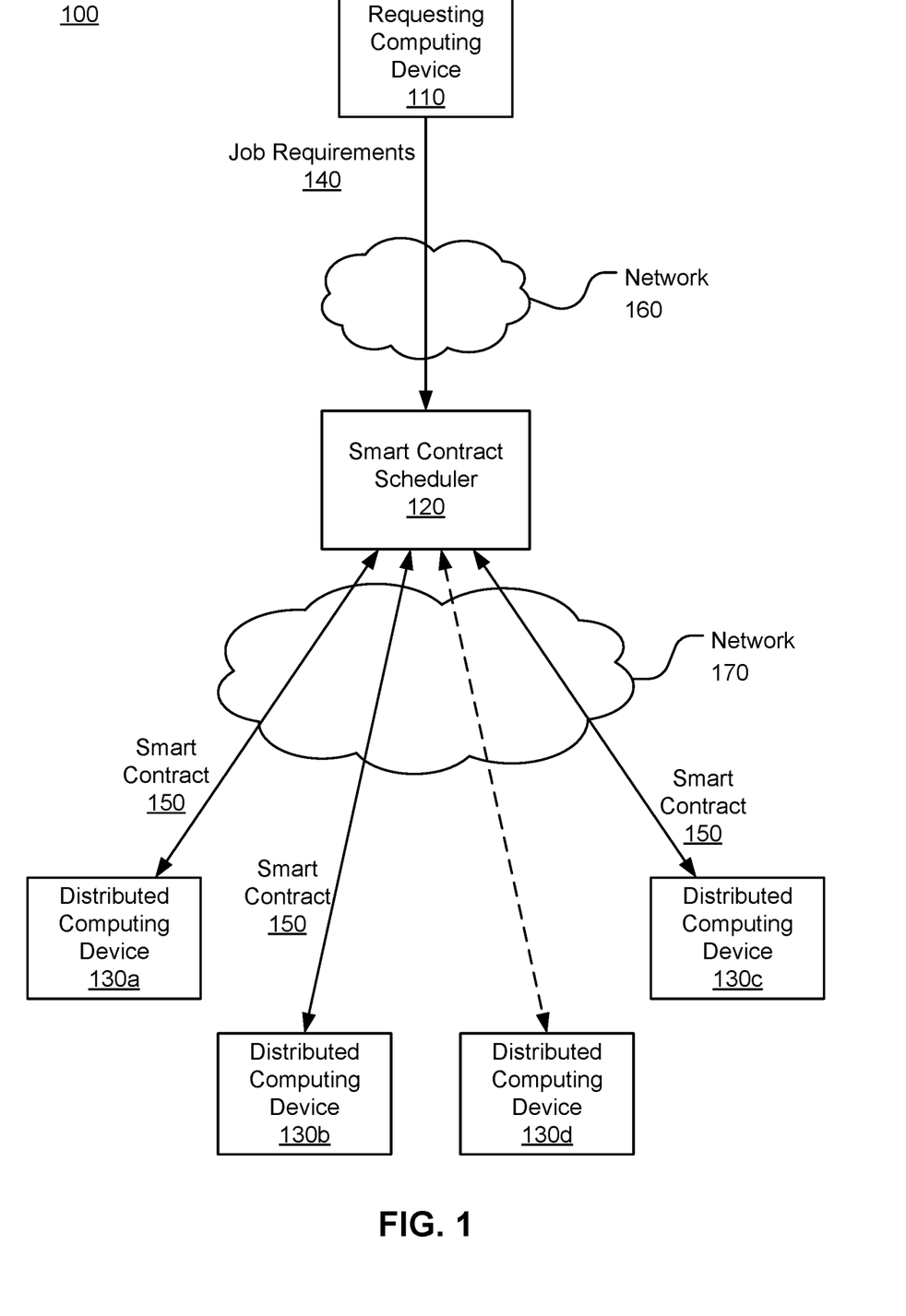
FIG. 1 is a flow diagram showing contract formation in an environment for distributed computing, according to one embodiment.

FIG. 1 illustrates contract formation in an exemplary environment 100 for distributed computing. In the example shown in FIG. 1, a requesting computing device 110 communicates over a network 160 with a smart contract scheduler 120, which is an intermediary computing device that coordinates computing resources for performing distributed computing tasks. The environment 100 also includes a set of distributed computing devices 130 that can connect to each other and to the smart contract scheduler 120 over a network 170. The networks 160 and 170 may be the same network, e.g., the Internet, or they may be different networks. FIG. 1 shows four distributed computing devices 130a, 130b, 130c, and 130d, but it should be understood that the environment 100 can include many more distributed computing devices, e.g., millions of distributed computing devices 130. Similarly, the environment 100 can include additional requesting computing devices 110 and smart contract schedulers 120. While the requesting computing device 110, smart contract scheduler 120, and distributed computing devices 130 are shown as separate computing devices, in other embodiments, some of the components in the environment 100 may be combined as a single physical computing device. For example, the requesting computing device 110 may include a smart contract scheduling component. As another example, the requesting computing device 110 and/or smart contract scheduler 120 are also distributed computing devices 130 with computing resources for performing requested calculations.

To request computation of a given computing task, the requesting computing device 110 transmits a set of job requirements 140 to the smart contract scheduler 120 over the network 160. The job requirements 140 may include, for example, minimum technical requirements for performing the task or a portion of the task, such as memory, disk space, number of processors, or network bandwidth. The job requirements 140 also include an amount and/or type of compensation offered by the requesting computing device 110 for the task or a portion of the task.

The smart contract scheduler 120 generates a smart contract 150 for the requesting computing device 110 based on the job requirements 140 and transmits the smart contract 150 to the distributed computing devices 130 over the network 170. The smart contract scheduler 120 may broadcast the smart contract 150 to all participating distributed computing devices 130, or transmit the smart contract 150 to some subset of the distributed computing devices 130. For example, the smart contract scheduler 120 may maintain a list of distributed computing devices 130 and their technical specifications, and identify a subset of the distributed computing devices 130 that meet one or more technical requirements provided in the job requirements 140. As another example, the smart contract scheduler 120 may determine, based on prior smart contracts, distributed computing devices 130 that are currently engaged with tasks for other smart contracts, and identify a subset of the distributed computing devices 130 that may be available for the smart contract 150.

Each distributed computing device 130 that receives the smart contract 150 from the smart contract scheduler 120 can independently determine whether the technical requirements and compensation are suitable. At least some portion of distributed computing devices 130 agree to the smart contract 150 and transmit their acceptance of the contract to the smart contract scheduler 120 over the network 170. In the example shown in FIG. 1, distributed computing devices 130a, 130b, and 130c agree to the smart contract 150, and distributed computing device 130d has not agreed to the smart contract. The distributed computing devices 130a-130c that agree to the smart contract 150 may each publish a signed copy of the smart contract 150 to a blockchain in which the distributed computing devices 130 and the smart contract scheduler 120 participate. Contracts published to the blockchain can be received by all participants, including the smart contract scheduler 120 and, in some embodiments, the requesting computing device 110.

While three distributed computing devices 130a-130c are shown as signing the smart contract 150 in FIG. 1, it should be understood that additional distributed computing devices 130 (e.g., tens of computing devices, thousands of computing devices, etc.) can sign a single smart contract and participate in the computing task. In some embodiments, the smart contract 150 specifies a requisite number of distributed computing devices 130 for performing the computing task. Once the requisite number of distributed computing devices publish their acceptance of the smart contract 150 to the blockchain, the distributed computing devices that have committed to the contract complete the computing task.

Once the distributed computing devices 130 have agreed to cooperate on the task, the distributed computing devices receive code provided by the requesting computing device 110 with instructions for completing the computing task. The requesting computing device 110 may transmit the code directly to the distributed computing devices 130a-130c over the network 170, or the requesting computing device 110 may provide the code to the distributed computing devices 130a-130c via the smart contract scheduler 120. In some embodiments, the code include checkpoints, which are used to indicate suitable restart locations for long-running calculations. In a long calculation, the code may fail before completion of a task, but after a distributed computing device 130 has performed a substantial amount of work. When a distributed computing device 130 successfully reach a specified checkpoint, the distributed computing device 130 is compensated for the work it has done up to that checkpoint.

In some embodiments, the distributed computing devices 130 cooperate for computing tasks that benefit the distributed computing devices 130 themselves, rather than for the benefit of a particular requesting computing device 110. For example, the distributed computing devices 130 may perform a DAC procedure for cooperative learning, such as decentralized Bayesian parameter learning, described in further detail below. In such embodiments, a distributed computing device 130 may not receive compensation from a requesting computing device, but instead receives the benefit of data and cooperation from the other distributed computing devices 130. The distributed computing devices 130 may sign a smart contract 150 with each other, rather than with a requesting computing device 110 outside of the group of distributed computing devices 130. Alternatively, the distributed computing devices 130 may cooperate on computing tasks without a smart contract 150. The distributed computing devices 130 may receive code for performing the calculations from a coordinating computing device, which may be one of the distributed computing devices 130 or another computing device.

The distributed computing devices 130 provide connection information to the other distributed computing devices 130 so that they are able to communicate their results to each other over the network 170. For example, the smart contract 150 may be implemented by a blockchain accessed by each of the distributed computing devices 130 and on which each distributed computing device 130 publishes connection information.

Figure 2:
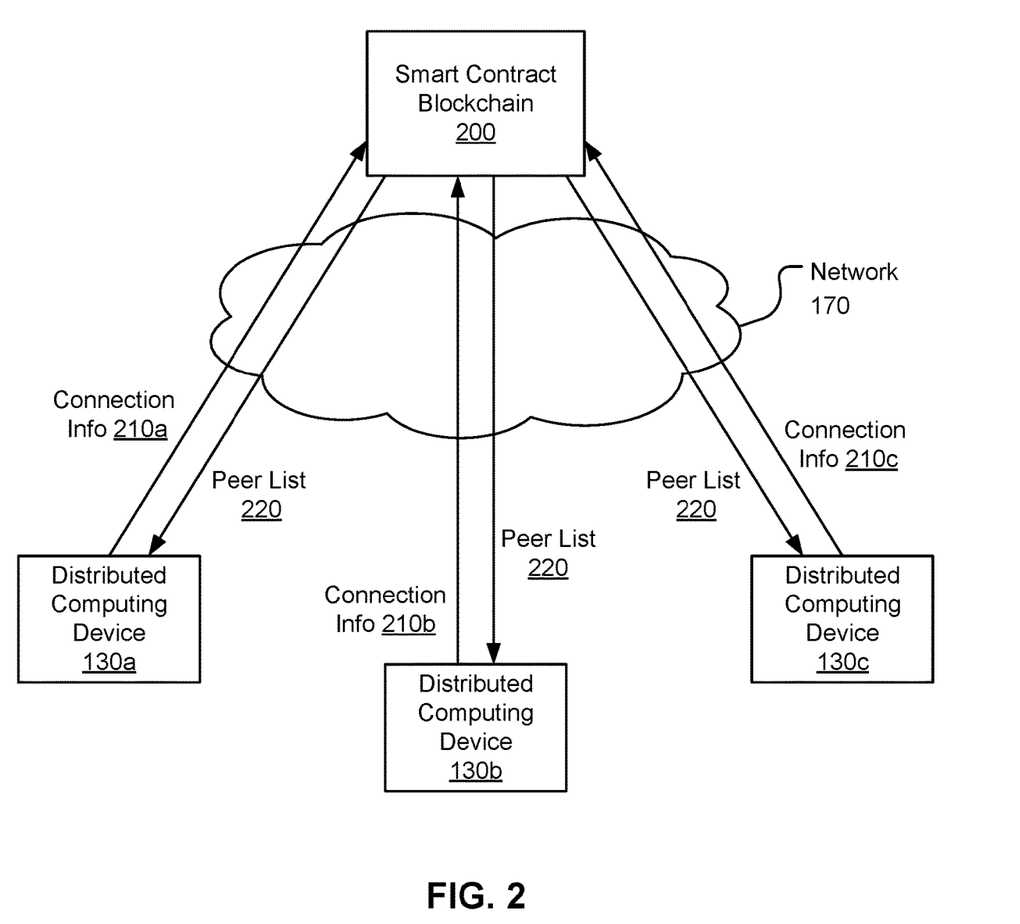
FIG. 2 is a flow diagram showing publishing of distributed computing device information in the environment of for distributed computing, according to one embodiment.

FIG. 2 is a flow diagram showing publishing of distributed computing device information in the environment for distributed computing shown in FIG. 1. The distributed computing devices 130a, 130b, and 130c that have signed the smart contract 150 each publish their respective connection information 210a, 210b, and 210c to a smart contract blockchain 200 over the network 170. Information published to the smart contract blockchain 200 is received by each of the distributed computing devices 130a-130c over the network 170. The connection information 210 can be, for example, the IP address of the distributed computing device 130 and the port on which the distributed computing device 130 wishes to receive communications from the other distributed computing devices. The distributed computing devices 130 each compile a peer list 220 based on the information published to the smart contract blockchain 200. The peer list 220 includes the connection information 210 for some or all of the distributed computing devices 130 that signed the smart contract 150. The peer list 220 allows each distributed computing device 130 to communicate with at least a portion of the other distributed computing devices over the network 170. Each distributed computing device 130 stores a local copy of the peer list 220. If the peer list 220 includes a portion of the distributed computing devices 130 that signed the smart contract 150, the peer lists 220 stored on different distributed computing devices 130 are different, e.g., each distributed computing device 130 may store a unique peer list containing some portion of the distributed computing devices 130 that signed the smart contract 150.

Figure 3:
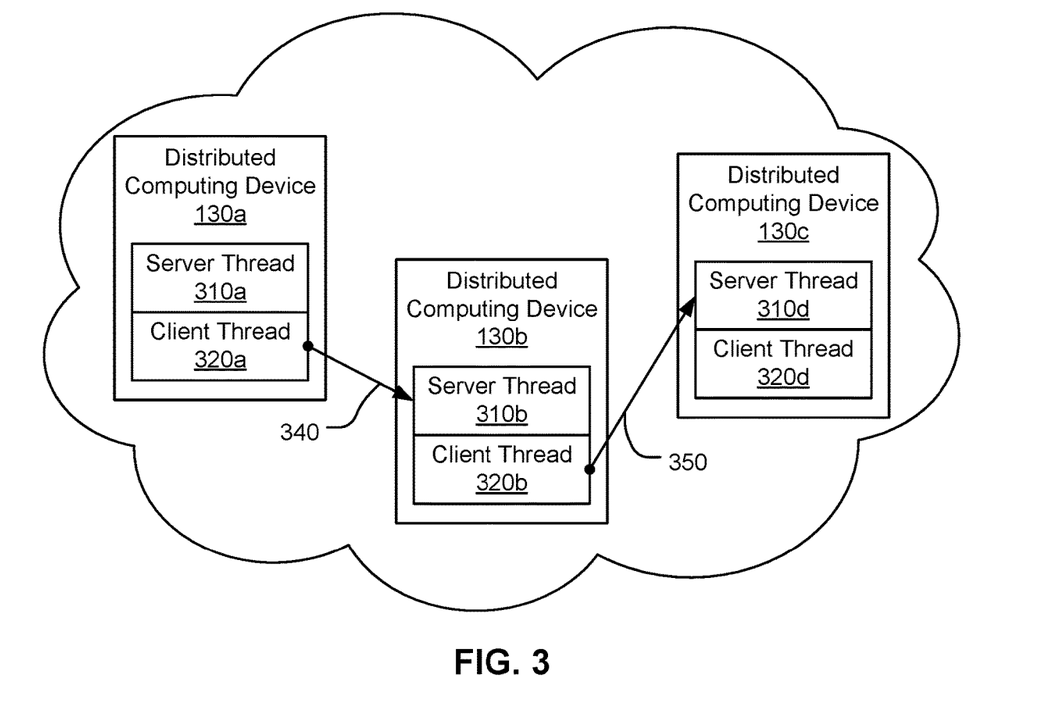
FIG. 3 is a block diagram showing peer-to-peer connections between distributed computing devices, according to one embodiment.

FIG. 3 illustrates peer-to-peer connections formed between distributed computing devices according to the peer list 220. After each distributed computing device 130 has performed its portion of the computation, the distributed computing devices 130 connect to each other (e.g., over the network 170 shown in FIGS. 1 and 2) to share results. To form the connections, each distributed computing device 130 initializes a server thread 310 to listen to the port that it posted to the smart contract blockchain 200, i.e., the port it provided in the connection information 210. Each distributed computing device 130 also initializes a client thread 320 capable of connecting to another distributed computing device 130. In the example shown in FIG. 3, the client thread 320a of distributed computing device 130a has formed a connection 340 to the server thread 310b of distributed computing device 130b using the connection information 210b provided by distributed computing device 130b. In addition, the client thread 320b of distributed computing device 130b has formed a connection 350 to the server thread 310c of distributed computing device 130c using the connection information 210c provided by distributed computing device 130c. Distributed computing devices 130a and 130b can share computing results over the connection 340, and distributed computing devices 130b and 130c can share computing results over the connection 350.

While three distributed computing devices 130 that signed the smart contract 150 are illustrated in FIGS. 1-3, in many cases, more distributed computing devices are involved in a computing task. According to the DAC protocol, the distributed computing devices 130 undertake a sequence of forming connections, sharing results, computing an average, and determining whether consensus is reached. If consensus has not been reached, the distributed computing devices 130 form a new set of connections, share current results (i.e., the most recently computed averages), compute a new average, and again determine whether consensus is reached. This process continues iteratively until consensus is reached. A mathematical discussion of the DAC algorithm is described in greater detail below.

Figure 4A:
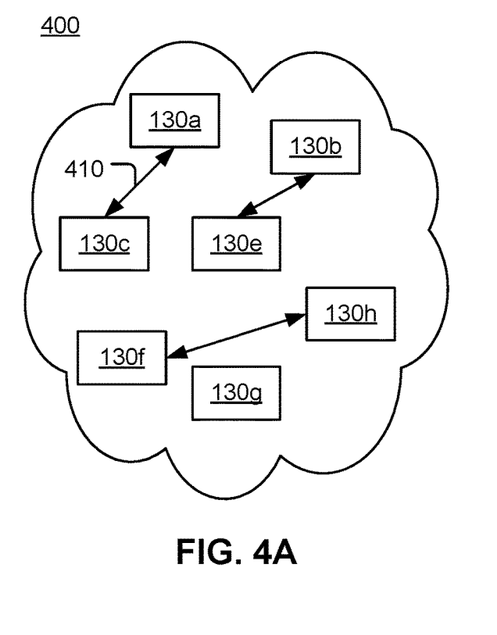
FIG. 4A is a diagram showing a first arrangement of peer connections among a group of distributed computing devices at a first time, according to one embodiment.

FIG. 4A illustrates a first arrangement 400 of peer connections formed among a group of seven distributed computing devices at a first time, according to one embodiment. FIG. 4A includes a set of seven distributed computing devices 130a-130g that have connected to form three sets of pairs. For example, distributed computing devices 130a is connected to distributed computing device 130c over connection 410. The distributed computing devices 130, or some portion of the distributed computing devices 130, may each select a random computing device from the pair list 220 and attempt to form a peer-to-peer connection. In the example shown in FIG. 4A, distributed computing device 130g has not formed a connection to any other distributed computing device in this iteration. In some embodiments, a single distributed computing device 130 may be connected to two other distributed computing devices, e.g., both the client thread and the server thread are connected to a respective computing device.

Figure 4B:
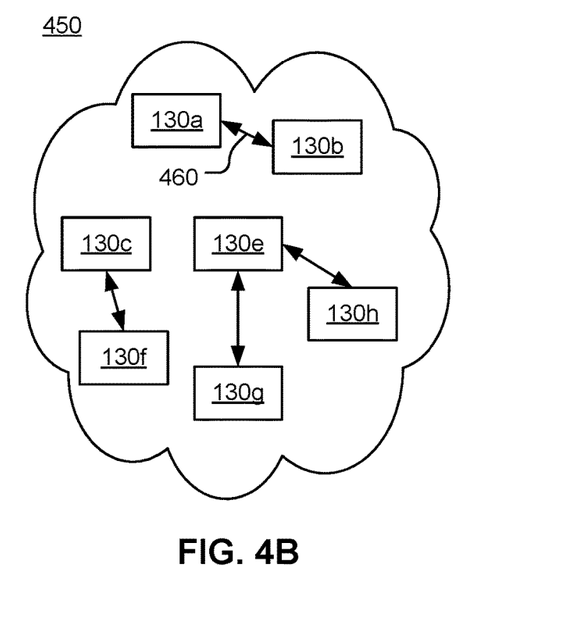
FIG. 4B is a diagram showing a second arrangement of peer-to-peer connections among the group of distributed computing devices at a second time, according to one embodiment.

FIG. 4B illustrates a second arrangement 450 of peer-to-peer connections among the group of distributed computing devices 130a-130g at a second time, according to one embodiment. The distributed computing devices 130a-130g have formed the connections in a different configuration from the connections 400 shown in FIG. 4A. For example, distributed computing device 130a is now connected to distributed computing device 130b over connection 460. The distributed computing devices 130a-130g continue to form new sets of connections and exchange data until they determine that distributed average consensus is reached.

In some embodiments, process replication is used to ensure that the loss of a distributed computing device 130 does not compromise the results of an entire computation task. Process replication provides a safeguard to the inherently unreliable nature of dynamic networks, and offers a mechanism for distributed computing devices 130 to check that peers computing devices 130 are indeed contributing to the calculation in which they are participating. In such embodiments, distributed computing devices 130 can be arranged into groups that are assigned the same data. When a group of distributed computing devices 130 assigned the same data reach a checkpoint, each computing device in the group of distributed computing devices can ensure that no other computing device in the group has cheated by hashing its current result (which should be the same across all computing devices in the group) with a piece of public information (such as a process ID assigned to the computing device), and sharing this with the group of computing devices. One or more computing devices in the group can check the current results received from other computing devices in the group to confirm that the other computing devices are participating and have obtained the same result.

Mathematical Theory of Distributed Average Consensus (DAC)

The distributed average consensus (DAC) algorithm is used in conjunction with a calculation in which a number of agents (e.g., N distributed computing devices 130), referred to as $N_{process}$ agents, must agree on their average value. The continuous time model for the local agent state governed by the DAC algorithm is given by the feedback model:

$$\dot{x}_i(t) = u_i(t)$$

$$x_i \in \mathbb{R}^n$$

$$i \in \{1, \ldots, N_{process}\} \quad (1)$$

where $x_i(t)$ is the numerical state of process i at time t, $\dot{x}_i(t)$ is the time derivative of the state, and $u_i(t)$ represents a particular consensus feedback protocol.

For illustrative purposes, a Nearest Neighbor protocol is used as the consensus feedback protocol:

$$u_i(t) = \sum_{\forall j \in \mathcal{N}_i} (x_j(t) - x_i(t)) \quad (2)$$

where $\mathcal{N}$ is the neighbor set of process i.

The global system can be written as the following dynamical system of the equations:

$$\dot{x}_i(t) = Lx(t)$$

$$x_i \in \mathbb{R}^{nN_{process}}$$

$$L \in \mathbb{R}^{nN_{process} \times nN_{process}} \quad (3)$$

where L is the graph Laplacian matrix.

In the case of a connected network, the unique and universally convergent equilibrium state of this system is as follows:

$$x_i(\infty) = \frac{1}{N_{process}} 1^T x(0) \quad (4)$$

where $1^t \in \mathbb{R}^{nN_{process}}$ is a vector of all ones. This result means that the agents in the network (e.g., the distributed computing devices 130) not only come to an agreement on a value, but a particular unique value: the average of the initial conditions of the agents on the network.

The rate at which $x_i(t)$ converges to $x_i(\infty)$ for this protocol is proportional to the smallest nonzero eigenvalue of the system Laplacian matrix L. Furthermore, the equilibrium state can be attained under dynamic, directional topologies with time delays. This notion of consensus is suitable for a distributed protocol since each process requires communication only with a set of neighboring processors, and there is no need for a fusion center or centralized node with global information. It is in this sense that consensus can be exploited in the distributed computing environment 100 to achieve a variety of useful tools for distributed computing, such as multi-agent estimation and control. Distributed consensus is particularly advantageous for performing reductions on distributed data because it bypasses the need for sophisticated routing protocols and overlay topologies for complicated distributed networks.

In order for each distributed computing device 130 to gauge its proximity to the global average and, based on the proximity, determine when to terminate the DAC algorithm, the distributed computing devices 130 compute a convergence indicator after each set of connections (e.g., after forming the set of connections shown in FIG. 4A or 4B). The convergence indicator can be represented geometrically, e.g., as a circle, sphere, or hypersphere, or, more generally, an n-sphere. An n-sphere is a generalization of a sphere to a space of arbitrary dimensions; for example, a circle is a 1-sphere, and an ordinary sphere is a 2-sphere. The distributed computing devices 130 can be assigned initial portions of the geometric structure, each having a center of mass. During each iteration of the DAC algorithm, each distributed computing device 130 exchanges with at least one neighboring distributed computing device two pieces of data: the distributed computing device's current $x_i(t)$, and the distributed computing device's current mass and position in the convergence indicator. Each distributed computing device 130 averages its $x_i(t)$ with the received $x_j(t)$ received from its neighbor to calculate $x_i(t+1)$; similarly, each distributed computing device 130 combines its center of mass with its neighbor's to determine a new center of mass. When the exchanges lead to the convergence indicator becoming sufficiently close to the global center of mass of the geometric structure, the DAC algorithm terminates, and the last $x_i$ can be used to calculate the final result of the computation task. A given distance from the center of mass of the geometric structure can be defined as a convergence threshold for determining when the process has converged. If the convergence process does not reach the center of mass of the geometric structure, this indicates that at least one distributed computing device 130 did not participate in the calculation.

Figure 5A:
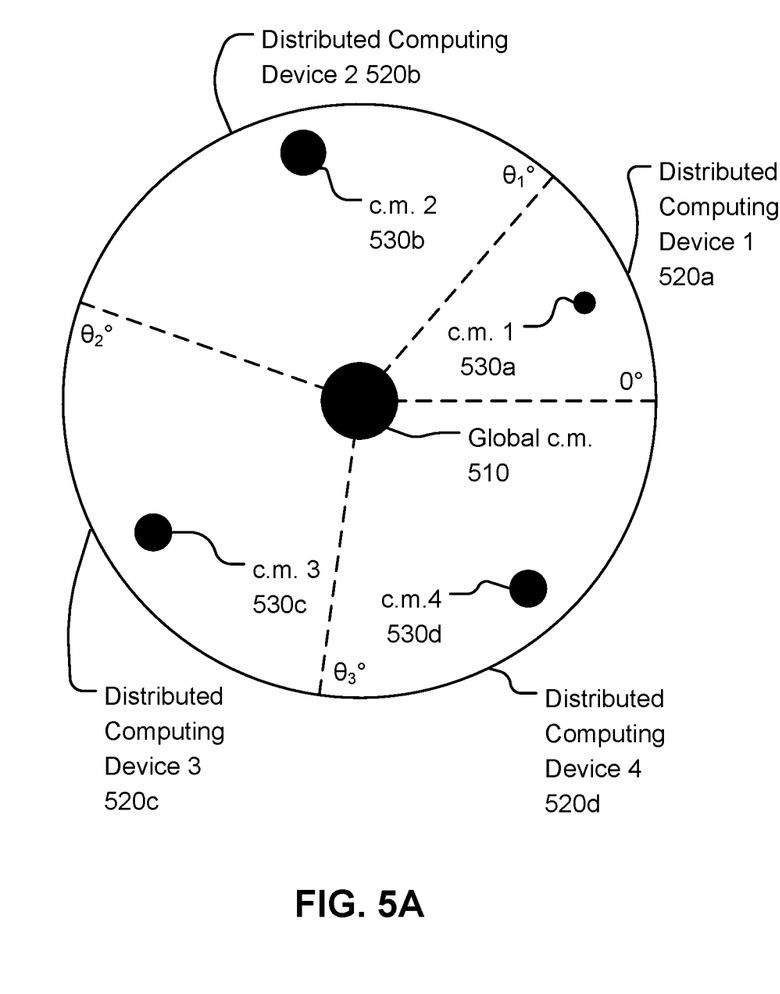
FIG. 5A is a graphical illustration of an initialized distributed average consensus convergence indicator, according to one embodiment.
Figure 5B:
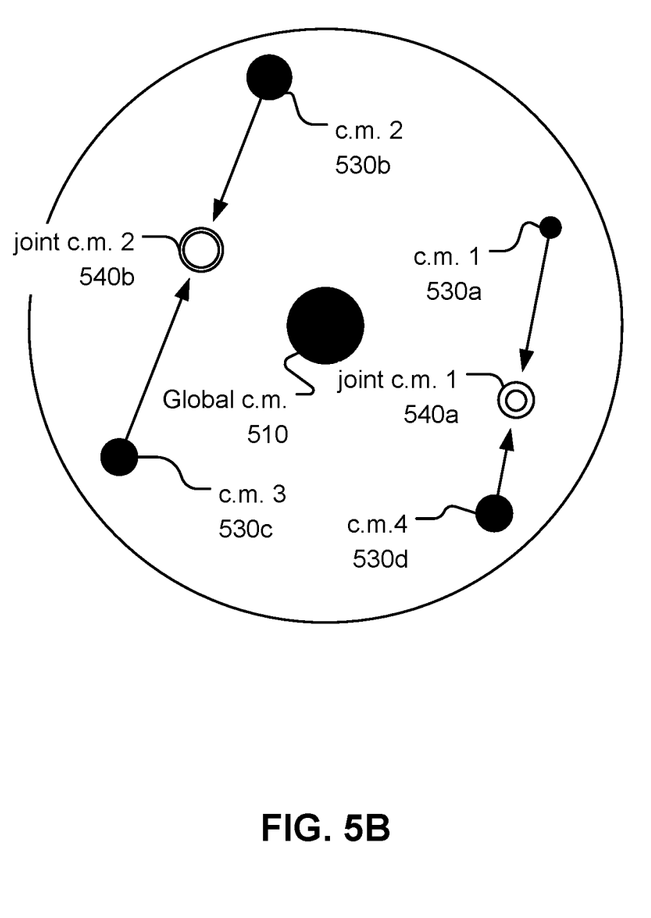
FIG. 5B is a graphical illustration of a first peer-to-peer update in a distributed average consensus convergence indicator, according to one embodiment.

An exemplary convergence scheme based on a unit circle is shown in FIGS. 5A and 5B. FIG. 5A is a graphical illustration of an initialized distributed average consensus convergence indicator, according to one embodiment. In this example, the convergence indicator is a circle having a global center of mass (c.m.) 510. Each distributed computing device 130 that signed the smart contract 150 is assigned a random, non-overlapping portion of an arc on a circle, e.g., a unit circle. For example, the smart contract scheduler 120, the requesting computing device 110, or one of the distributed computing devices 130 may determine and assign arcs to the participating distributed computing devices 130. In the example shown in FIG. 5A, a first portion of the arc between 0° and $\theta_1$° is assigned to a distributed computing device 1 520a. Three additional portions of the circle are assigned to three additional distributed computing devices 520b-520d. The distributed computing devices 520 are embodiments of the distributed computing devices 130 described above. As shown in FIG. 5A, the arcs are not of equal size; for example, the arc assigned to distributed computing device 1 520a is smaller than the arc assigned to distributed computing device 2 520b. Each distributed computing device 520 computes the center of mass (c.m.) 530 of its unique arc, including both the mass and location of the center of mass. The differing masses are represented in FIG. 5A as different sizes of the centers of mass 530; for example, the circle around c.m. 1 530a is smaller than the circle around c.m. 2 530b, because the portion assigned to distributed computing device 1 520a is smaller than the portion assigned to distributed computing device 2 520b and therefore has a smaller mass.

After each successful connection (e.g., after the distributed computing devices 520 form the first set of peer connections shown in FIG. 4A or the second set of peer connections shown in FIG. 4B), each distributed computing device updates the location of its c.m. relative to the c.m. of the distributed computing device to which it connected and exchanged data. FIG. 5B is a graphical illustration of a first peer-to-peer update in the distributed average consensus convergence indicator shown in FIG. 5A. In this example, distributed computing device 1 520a has connected to distributed computing device 4 520d, and distributed computing device 2 520b has connected to distributed computing device 3 520c. Each set of connecting distributed computing devices exchange their respective centers of mass and calculate a joint center of mass. For example, distributed computing devices 1 and 4 calculate the joint c.m. 1 540a based on the locations and masses of c.m. 1 530a and c.m. 4 530d. As shown, joint c.m. 1 540a is partway between c.m. 1 530a and c.m. 4 530d, but closer to c.m. 4 530d due to its larger mass.

As described with respect to FIGS. 4A and 4B, the distributed computing devices 520 continue forming different sets of connections. This iterative procedure of connecting, exchanging, and updating continues until the distributed computing devices 520 reach a center of mass that is within a specified distance of the global center of mass 510, at which point the distributed computing devices 520 terminate the consensus operation. The specified distance from the global center of mass 510 for stopping the iterative procedure may be a specified error tolerance value, e.g., 0.0001, or $1 \times 10^{-10}$. If the distributed computing devices 520 do not reach the global center of mass 510, this indicates that at least one distributed computing device did not participate in the consensus mechanism. For example, if one distributed computing device did not participate in consensus, the center of mass determined by the DAC procedure is pulled away from that distributed computing device's portion of the arc, because that distributed computing device, represented by its assigned mass, did not contribute to DAC procedure. The distributed computing devices 520 may perform the iterative procedure a particular number of times before stopping even if convergence is not reached. The number of iterations to attempt convergence may be based on the number of distributed computing devices participating in the DAC process. Alternatively, the distributed computing devices may perform the iterative procedure until the center of mass becomes stationary, e.g., stationary within a specified threshold.

If multiple distributed computing devices do not participate in consensus, it may be difficult to identify the non-participating computing devices from a circular structure. Therefore, in some embodiments, a higher dimensional shape is used as the convergence indicator, such as a sphere or a hypersphere. In such embodiments, each distributed computing device is assigned a higher-dimensional portion of the shape; for example, if the convergence indicator is a sphere, each distributed computing device is assigned a respective section of the sphere. Using a higher number of dimensions for a higher number of distributed computing devices involved in a computation task (e.g., N dimensions for N distributed computing devices) can ensure that the non-participating distributed computing devices are identified.

Example Applications of Distributed Average Consensus (DAC)

The DAC algorithm can be used to perform a dot product calculation. The dot product is one of the most important primitive algebraic manipulations for parallel computing applications. Without a method for computing distributed dot products, critical parallel numerical methods (such as conjugate gradients, Newton-Krylov, or GMRES) for simulations and machine learning are not possible. The DAC algorithm, described above, can be used to perform a dot product of two vectors x and y, represented as $x^Ty$, in a distributed manner by assigning distributed computing devices 130 to perform respective local dot products on local sub-vectors, and then having the distributed computing devices 130 perform consensus on the resulting local scalar values. After consensus is reached, the result of the consensus on the scalar values is multiplied by the number of processes in the computation. The relationship between the dot product $x^Ty$ of two vectors of length n and the average of the local scalar calculations $x_iy_i$ is as follows:

$$x^Ty = x_1y_1 + \cdots + x_ny_n = n\left(\sum_{i=1}^{n} \frac{x_iy_i}{n}\right) \quad (5)$$

Figure 6:
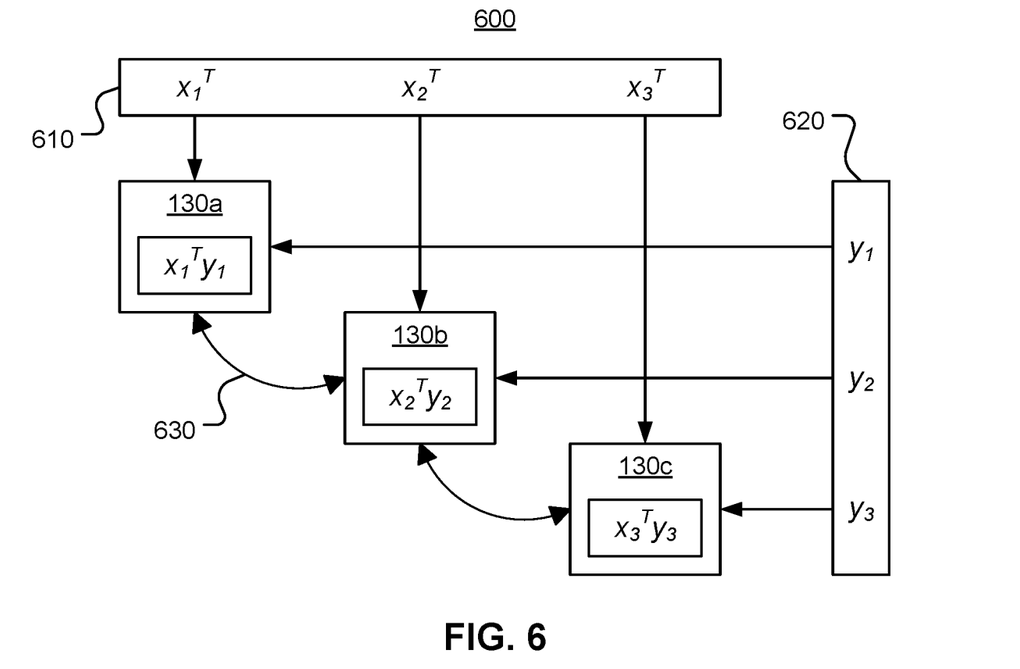
FIG. 6 illustrates an example of using distributed computing devices to perform a distributed dot product calculation, according to one embodiment.

FIG. 6 illustrates an example 600 of using three distributed computing devices to perform a distributed dot product calculation, according to one embodiment. In FIG. 6, a first vector x 610 is partitioned into three sub-vectors, $x_1^T$, $x_2^T$, and $x_3^T$. A second vector y 620 is also partitioned into three sub-vectors, $y_1$, $y_2$, and $y_3$. A first distributed computing device 130a receives the first vector portions $x_1^T$ and $y_1$ and calculates the dot product $x_1^Ty_1$. Second and third distributed computing devices 130b and 130c calculate dot products $x_2^Ty_2$ and $x_3^Ty_3$, respectively. The distributed computing devices 130a-130c exchange the dot products via connections 630 and calculate averages, as described above, until consensus is reached. After consensus, the average dot product is multiplied by the number of participating distributed computing devices 130 (in this example, 3) to determine $x^Ty$.

The DAC algorithm can be performed on scalar quantities, as shown in the dot product example, and on vector quantities. In a second example, the DAC algorithm is used to perform a distributed matrix-vector product calculation. Distributed matrix-vector products are essential for most iterative numerical schemes, such as fixed point iteration or successive approximation. To calculate a matrix-vector product, a matrix is partitioned column-wise, and each distributed computing device 130 receives one or more columns of the global matrix. A local matrix-vector product is calculated at each distributed computing device 130, and average consensus is performed on the resulting local vectors. The consensus result is then multiplied by the number of distributed computing devices 130 in the computation.

Figure 7:
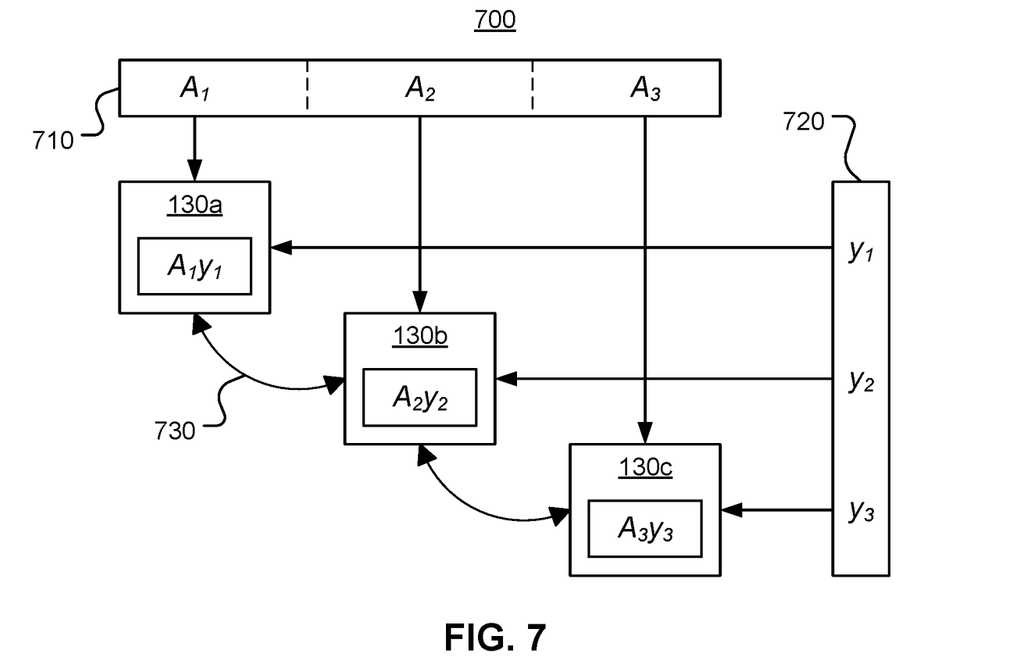
FIG. 7 illustrates an example of using distributed computing devices to perform a distributed matrix-vector product calculation, according to one embodiment.

FIG. 7 illustrates an example 700 of using three distributed computing devices to perform a distributed matrix-vector product calculation, according to one embodiment. In FIG. 7, a first matrix A 710 is partitioned column-wise into three sub-matrices, $A_1$, $A_2$, and $A_3$. A vector y 720 is partitioned into three sub-vectors, $y_1$, $y_2z$, and $y_3$. The first distributed computing device 130a receives the first matrix portion $A_1$ and the first vector portion $y_1$ and calculates the matrix-vector product $A_1y_1$. The second and third distributed computing devices 130b and 130c calculate the matrix-vector products $A_2y_2$ and $A_3y_3$, respectively. The distributed computing devices 130a-130c exchange the matrix-vector products via connections 730 and calculate averages, as described above, until consensus is reached. After consensus, the average matrix-vector product is multiplied by the number of participating distributed computing devices 130.

As another example, the DAC algorithm is used to calculate a distributed least squares regression. Least squares is one of the most important regressions used by scientists and engineers. It is one of the main numerical ingredients in software designed for maximum likelihood estimation, image reconstruction, neural network training, and other applications. The problem of finding the least-squares solution to an overdetermined system of equations can be defined as follows:

$$Ax=b$$

$$A \in \mathbb{R}^{n \cdot N_{process} \times M} \quad (6)$$

In the above equations, A is a sensing matrix, x is the least-squares solution vector, and b is a target vector. The solution to this problem is given by the pseudo inverse, as follows:

$$x=(A^TA)^{-1}A^Tb \quad (7)$$

In some embodiments of parallel computing applications, the sensing matrix, A, is distributed row-wise and the least-squares solution, x, is solved for locally on each computational node since the local least-squares solutions, or components of the least-squares solutions (e.g., local components for $A^Tb$ and $A^TA$) are small in comparison to the total number of measurements. This means that each distributed computing device 130 in the network owns a few rows (e.g., measurements) of the sensing matrix A and the target vector b. The least squares solution x for the system can be recovered from the local least-squares solutions using the DAC algorithm. The portions of the sensing matrix and target vector owned by a given distributed computing device i are represented as $A_i$ and $b_i$, respectively. Each distributed computing device i calculates the products $A_i^Tb_i$ and $A_i^TA_i$ and stores these products in its local memory. DAC is then performed on these quantities, which both are small compared to the total number of observations in A. The results of the DAC process are $$\frac{1}{n}\sum_{i=1}^{n} A_i^TA_i \text{ and } \frac{1}{n}\sum_{i=1}^{n} A_i^Tb_i,$$

which are present at every distributed computing device at the end of the DAC process. These quantities are multiplied by the number n of processes in the computation, so that every distributed computing device has copies of $A^Tb$ and $A^TA$ that can be used to locally obtain the least squares fit to the global data set.

Figure 8:
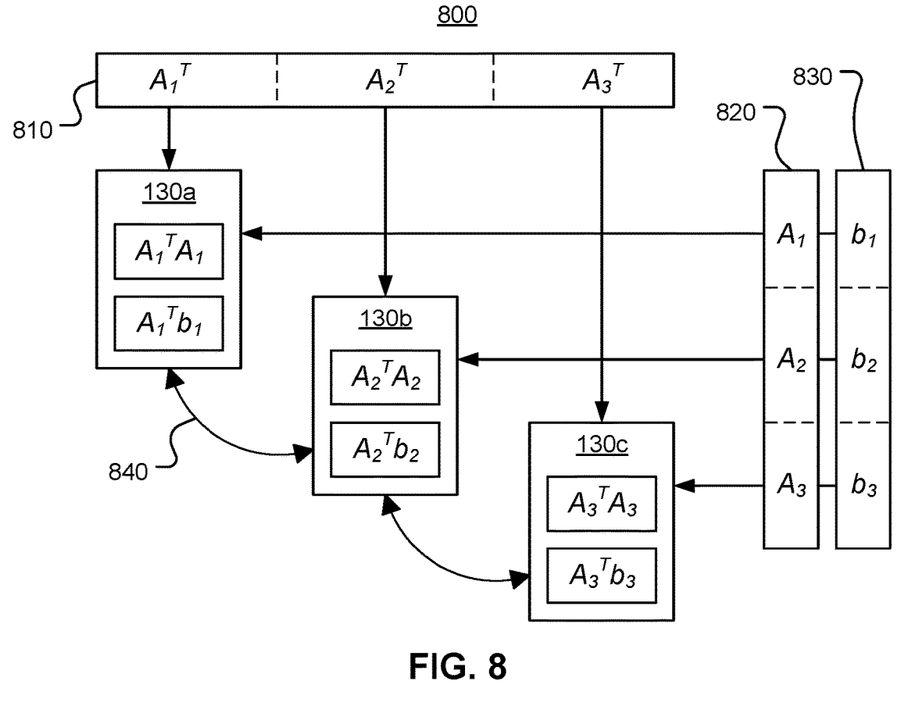
FIG. 8 illustrates an example of using distributed computing devices to perform a distributed least squares calculation, according to one embodiment.

FIG. 8 illustrates an example 800 of using three distributed computing devices to perform a distributed least squares calculation, according to one embodiment. In FIG. 8, the transpose of the sensing matrix $A^T$ 810 is partitioned column-wise into three sub-matrices, $A_1^T$, $A_2^T$, and $A_3^T$. The sensing matrix A 820 is partitioned row-wise into three sub-matrices, $A_1$, $A_2$, and $A_3$. Each distributed computing device 130a-130c calculates a respective matrix-matrix product $A_1^T A_1$, $A_2^T A_2$, and $A_3^T A_3$. In addition, each distributed computing device 130a-130c has a respective portion of the target vector b 830 and calculates a respective matrix-vector product $A_1^T b_1$, $A_2^T b_2$, and $A_3^T b_3$, similar to the calculation shown in FIG. 7. The distributed computing devices 130a-130c exchange the matrix-matrix products and matrix-vector products via connections 840 and calculate averages of these products, as described above, until consensus is reached. After consensus, the average matrix-matrix product and average matrix-vector product are multiplied by the number of participating distributed computing devices 130, and the results are used to calculate the least square solution x.

As another example, the DAC algorithm can be applied to decentralized Bayesian parameter learning. Many industrial applications benefit from having a data-driven statistical model of a given process based on prior knowledge. Economic time series, seismology data, and speech recognition are just a few big data applications that leverage recursive Bayesian estimation for refining statistical representations. DAC can be used to facilitate recursive Bayesian estimation on distributed data sets.

In an exemplary decentralized Bayesian parameter learning process, each distributed computing device attempts to estimate a quantity, x, via a probability distribution, $p(x) = p(x|y_{1:n})$. Each distributed computing device $i \in \{1, \ldots n\}$ makes an observation, $y_i$, that is related to the quantity of interest through a predefined statistical model, $\mu_i(y_i, x)$. Under mild conditions, the Bayesian estimate of x is proportional to:

$$\pi(x) \propto \pi_0(x) \prod_{i=1:n} \mu_i(y_i, x) \quad (8)$$

where $\pi_1(x)$ is the prior distribution based on past knowledge. The posterior estimate, $\pi(x)$, conditional on the distributed measurements can be computed using the DAC approach by rewriting the product term in equation 8 in the form of an average quantity:

$$\pi(x) \propto \pi_0(x) \exp\left(\frac{1}{n} \sum_{i=1:n} \ln(\mu_i(y_i, x))\right)^n \quad (9)$$

Leveraging DAC to compute the global average of the distributed measurement functions allows each distributed computing device to consistently update its local posterior estimate without direct knowledge or explicit communication with the rest of the global data set.

Figure 9:
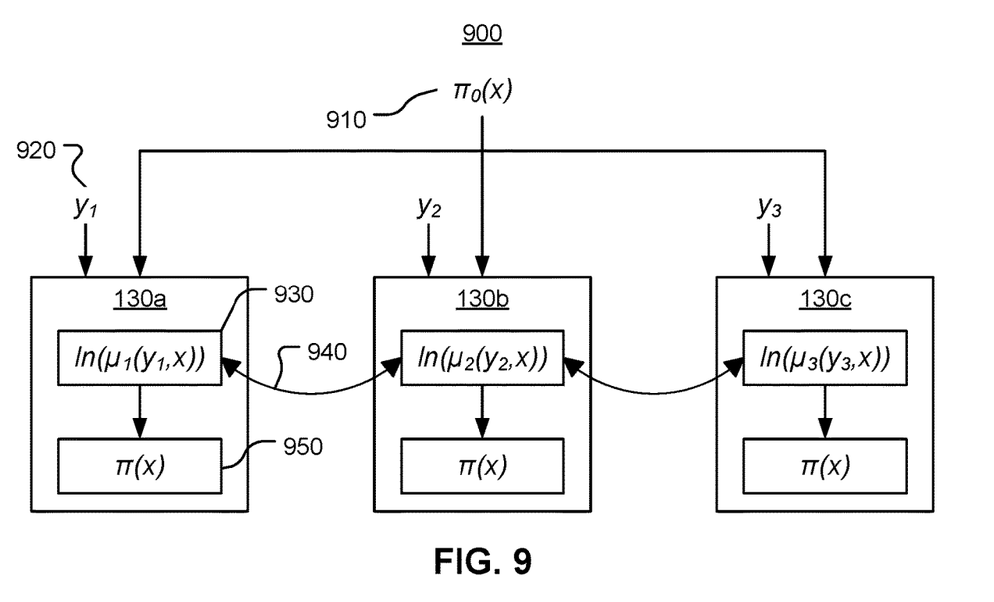
FIG. 9 illustrates an example of using distributed computing devices to perform decentralized Bayesian parameter learning, according to one embodiment.

FIG. 9 illustrates an example 900 of using three distributed computing devices to perform decentralized Bayesian parameter learning, according to one embodiment. In FIG. 9, each distributed computing device 130 receives or calculates the prior distribution $\pi_0(x)$ 910. In addition, each distributed computing device 130a makes or receives a respective observation or set of observations $y_i$; for example, distributed computing device 130a receives the observation $y_1$ 920. Based on the prior distribution $\pi_0(x)$ and observation $y_i$, each distributed computing device 130a-130c calculates the quantity $\ln(\mu_o(y_i, x))$; for example distributed computing device 130 calculates $\mu_1(y_1, x)$ 930. The distributed computing devices 130a-130c exchange the calculated quantities via connections 940 and calculate averages, as described above, until consensus is reached. After consensus, the distributed computing devices 130 use the average of the quantity $\ln(\mu_i(y_i, x))$ to calculate the posterior estimate, $\pi(x)$ 950, according to equation 9.

While four example calculations described shown in FIGS. 6-9 each are shown in distributed environments with three computing devices, it should be understood that the calculations can be performed using larger sets of distributed computing devices. In addition, the DAC method can be used for other types of calculations that involve calculating an average, e.g., any type of calculation from which a higher result can be obtained from an average.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for distributed computing comprising:
   receiving over a network, at a first distributed computing device of a plurality of distributed computing devices, a data partition of a plurality of data partitions for a computing task, wherein each of the plurality of distributed computing devices is assigned a respective data partition of the plurality of data partitions;
   generating, by the first distributed computing device, a first partial result of a plurality of partial results generated by the plurality of distributed computing devices;
   at the first distributed computing device, iteratively executing a distributed average consensus (DAC) process comprising, for each iteration of the process:
      transmitting the first partial result of the first distributed computing device to a second distributed computing device of the plurality of distributed computing devices,
      receiving a second partial result generated by the second distributed computing device from the second distributed computing device, and
      updating the first partial result of the first distributed computing device by computing an average of the first partial result and the second partial result, wherein indicia of contribution by both the first distributed computing device and the second distributed computing device is incorporated into the first partial result,
   in response to determining that respective partial results of the plurality of distributed computing devices have reached a consensus value, determining to stop executing the DAC process; and
   generating, by the first distributed computing device, a final result of the computing task based on the consensus value, wherein a third distributed computing device of the plurality of distributed computing devices was assigned to generate a third partial result to be used to obtain the final result but failed to generate the third partial result, and wherein the failure of the third distributed computing device is derivable from the final result based on an inclusion of the indicia of contribution by both the first distributed computing device and the second distributed computing device, and based on an absence of indicia of contribution by the third distributed computing device to the final result.

2. The method of claim 1, wherein a requesting computing device provides the computing task and a set of requirements for the computing task to an intermediary computing device, the method further comprising:
   receiving over the network, at the first distributed computing device from the intermediary computing device, a smart contract generated by the intermediary computing device, the smart contract comprising the set of requirements;
   determining, by the first distributed computing device, that the first distributed computing device meets the set of requirements; and
   transmitting over the network, from the first distributed computing device, a commitment to perform the computing task to the intermediary computing device.

3. The method of claim 2, wherein the first distributed computing device receives instructions for performing the computing task from the intermediary computing device over the network, and the first distributed computing device executes the DAC process according to the received instructions.

4. The method of claim 1, the method further comprising:
   publishing, by the first distributed computing device to a blockchain, connection information for communicating with the first distributed computing device; and
   compiling, by the first distributed computing device, a peer list comprising connection information published to the blockchain for at least a portion of the plurality of distributed computing devices;
   wherein executing a DAC process for each iteration of the process further comprises forming a connection with the second distributed computing device over the network according to connection information for the second distributed computing device from the peer list.

5. The method of claim 1, wherein the second distributed computing device during a first iteration of the DAC process and the second distributed computing device during a second iteration of the DAC process are different distributed computing devices of the plurality of distributed computing devices.

6. The method of claim 1, wherein iteratively executing the DAC process further comprises, for each iteration of the process:
   transmitting over the network a first convergence indicator of the first distributed computing device to the second distributed computing device;
   receiving over the network a second convergence indicator of the second distributed computing device from the second distributed computing device; and
   updating the first convergence indicator of the first distributed computing device by determining a center of mass of the first convergence indicator and the second convergence indicator.

7. The method of claim 6, wherein determining that respective partial results of the plurality of distributed computing devices have reached a consensus value comprises determining that the first convergence indicator of the first distributed computing device is within a threshold distance of a global center of mass of the convergence indicator.

8. The method of claim 7, wherein the convergence indicator comprises an n-sphere, the method further comprising receiving data specifying a portion of the n-sphere having center of mass comprising a weight and a position, wherein each distributed computing device of the plurality of distributed computing devices is assigned a respective non-overlapping portion of the n-sphere.

9. The method of claim 1, wherein the computing task comprises at least one of a distributed dot product, a distributed matrix-vector product, a distributed least squares calculation, or decentralized Bayesian parameter learning.

10. A method for distributed computing comprising:
    receiving over a network, at an intermediary computing device, a request for completing a computing task from a requesting computing device, the request comprising a set of requirements for the computing task;

transmitting, by the intermediary computing device, at least a portion of the set of requirements to a plurality of distributed computing devices over the network;
receiving commitments from the plurality of distributed computing devices over the network to perform the computing task, each of the plurality of distributed computing devices meeting the portion of the set of requirements;
transmitting, to each of the plurality of distributed computing devices, a respective data partition of a plurality of data partitions for the computing task, wherein the plurality of distributed computing devices are configured to iteratively execute a distributed average consensus (DAC) process to calculate a consensus value for the computing task, and wherein indicia of contribution by the plurality of distributed computing devices is determined as the plurality of distributed computing devices actually execute the DAC process; and
returning a result of the computing task to the requesting computing device, wherein a failure to contribute of a non-contributing distributed computing device of the plurality of distributed computing devices is derivable from the final result based on the indicia of contribution lacking an indicia of contribution by the non-contributing distributed computing device.

11. The method of claim 10, further comprising transmitting over the network instructions to a first distributed computing device of the plurality of distributed computing devices to iteratively execute the DAC process by, for each iteration of the DAC process:
transmitting over the network a first partial result for the computing task to at least one other of the plurality of distributed computing devices;
receiving over the network a second partial result for the computing task from the at least one other distributed computing device; and
updating the first partial result for the computing task by computing an average of the first partial result and the second partial result.

12. The method of claim 11, further comprising transmitting instructions over the network to the first distributed computing device of the plurality of distributed computing devices to determine that respective partial results of the plurality of distributed computing devices have reached a consensus value, and, in response to the determination, stop execution of the DAC process.

13. The method of claim 10, further comprising:
assigning, to each of the plurality of distributed computing devices, a portion of a convergence indicator, each portion of the convergence indicator having a center of mass, and the convergence indicator having a global center of mass;
transmitting over the network, to each of the plurality of distributed computing devices, data specifying the portion of the convergence indicator assigned to the distributed computing device; and
receiving over the network, from at least one of the plurality of distributed computing devices, confirmation that the convergence indicator is within a threshold distance of a global center of mass of the convergence indicator, wherein the plurality of the distributed computing devices iteratively update the respective convergence indicators during execution of the DAC process.

14. The method of claim 13, wherein the convergence indicator comprises an n-sphere, each distributed computing device of the plurality of distributed computing devices is assigned a respective non-overlapping portion of the n-sphere, and the data specifying each portion of the convergence indicator comprises a respective weight and a respective position of the center of mass of the portion of the convergence indicator.

15. The method of claim 10, wherein at least the portion of the set of requirements transmitted to the plurality of distributed computing devices and the commitments from the plurality of distributed computing devices to perform the computing task are recorded in a smart contract.

16. A non-transitory computer readable storage medium configured to store program code, the program code comprising instructions that, when executed by one or more processors, cause the one or more processors to:
receive, over a network, a request for completing a computing task from a requesting computing device, the request comprising a set of requirements for the computing task;
transmit at least a portion of the set of requirements to a plurality of distributed computing devices over the network;
receive commitments from the plurality of distributed computing devices over the network to perform the computing task, each of the plurality of distributed computing devices meeting the portion of the set of requirements;
transmit, to each of the plurality of distributed computing devices, a respective data partition of a plurality of data partitions for the computing task, wherein the plurality of distributed computing devices are configured to iteratively execute a distributed average consensus (DAC) process to calculate a consensus value for the computing task, and wherein indicia of contribution by the plurality of distributed computing devices is determined as the plurality of distributed computing devices actually execute the DAC process; and
return a result of the computing task to the requesting computing device, wherein a failure to contribute of a non-contributing distributed computing device of the plurality of distributed computing devices is derivable from the final result based on the indicia of contribution lacking an indicia of contribution by the non-contributing distributed computing device.

17. The non-transitory computer readable storage medium of claim 16, further comprising instructions to transmit over the network DAC instructions to a first distributed computing device of the plurality of distributed computing devices, the DAC instructions comprising instructions to iteratively execute the DAC process, for each iteration of the DAC process, by:
transmitting over the network a first partial result for the computing task to at least one other of the plurality of distributed computing devices;
receiving over the network a second partial result for the computing task from the at least one other distributed computing device; and
updating the first partial result for the computing task by computing an average of the first partial result and the second partial result.

18. The non-transitory computer readable storage medium of claim 17, wherein the DAC instructions further comprise instructions to determine that respective partial results of the plurality of distributed computing devices have reached a consensus value, and, in response to the determination, stop execution of the DAC process.

19. The non-transitory computer readable storage medium of claim 16, further comprising instructions to:

assign, to each of the plurality of distributed computing devices, a portion of a convergence indicator, each portion having a center of mass, and the convergence indicator having a global center of mass;

transmit over the network, to each of the plurality of distributed computing devices, data specifying the portion of the convergence indicator assigned to the distributed computing device; and receive over the network, from at least one of the plurality of distributed computing devices, confirmation that the convergence indicator is within a threshold distance of a global center of mass of the convergence indicator, wherein the plurality of the distributed computing devices iteratively update the respective convergence indicators during execution of the DAC process.

20. The non-transitory computer readable storage medium of claim 19, wherein the convergence indicator comprises an n-sphere, each distributed computing device of the plurality of distributed computing devices is assigned a respective non-overlapping portion of the n-sphere, and the data specifying each portion of the convergence indicator comprises a respective weight and a respective position of the center of mass of the portion of the convergence indicator.

* * * * *